(12) United States Patent
Liu

(10) Patent No.: US 11,558,843 B2
(45) Date of Patent: Jan. 17, 2023

(54) INFORMATION TRANSMISSION METHOD AND APPARATUS, AND COMMUNICATION DEVICE

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 47 days.

(21) Appl. No.: 17/156,440

(22) Filed: Jan. 22, 2021

(65) Prior Publication Data

US 2021/0144663 A1    May 13, 2021

Related U.S. Application Data

(63) Continuation of application No. PCT/CN2018/099263, filed on Aug. 7, 2018.

(51) Int. Cl.
*H04W 56/00*    (2009.01)
*H04W 76/12*    (2018.01)
(Continued)

(52) U.S. Cl.
CPC ........... *H04W 56/009* (2013.01); *H04J 3/065* (2013.01); *H04L 43/106* (2013.01); *H04W 76/11* (2018.02);
(Continued)

(58) Field of Classification Search
CPC .. H04J 3/065; H04L 43/0852; H04L 43/0858; H04L 43/0864; H04L 43/106;
(Continued)

(56) References Cited

U.S. PATENT DOCUMENTS

2010/0228824 A1    9/2010 Lin
2011/0075582 A1*   3/2011 Sugiyama ............. H04L 43/091
                                                      370/252
(Continued)

FOREIGN PATENT DOCUMENTS

CN    1933429 A    3/2007
CN    102655463 A  9/2012
(Continued)

OTHER PUBLICATIONS

Second Office Action of the Chinese application No. 202010591936. 1, dated Sep. 18, 2021. 21 pages with English translation.
(Continued)

*Primary Examiner* — Pao Sinkantarakorn
(74) *Attorney, Agent, or Firm* — Perkins Coie LLP

(57) ABSTRACT

An information transmission method and apparatus are provided. The method comprises: a first node sends a first data packet to a second node, the first data packet carrying at least one of the following information: first identifier information, first sequence number information, and first timestamp information, wherein the first identifier information is used for instructing the second node returns a second data packet after receiving the first data packet; the first sequence number information is used for identifying the first data packet; and the first timestamp information is used for instructing the first node to send time information of the first data packet.

16 Claims, 4 Drawing Sheets

(51) Int. Cl.
  *H04W 76/11* (2018.01)
  *H04J 3/06* (2006.01)
  *H04L 43/106* (2022.01)
  *H04L 43/0852* (2022.01)
  *H04L 43/0864* (2022.01)

(52) U.S. Cl.
  CPC ......... *H04W 76/12* (2018.02); *H04L 43/0858* (2013.01); *H04L 43/0864* (2013.01)

(58) Field of Classification Search
  CPC ..... H04L 43/16; H04W 56/009; H04W 76/11; H04W 76/12
  See application file for complete search history.

(56) References Cited

U.S. PATENT DOCUMENTS

| | | | |
|---|---|---|---|
| 2011/0128856 A1* | 6/2011 | Won | H04L 43/0852 370/237 |
| 2011/0319071 A1 | 12/2011 | Beppler | |
| 2018/0077594 A1 | 3/2018 | He et al. | |
| 2018/0213426 A1 | 7/2018 | Latheef et al. | |
| 2020/0022012 A1 | 1/2020 | Latheef et al. | |
| 2021/0153070 A1* | 5/2021 | Velev | H04W 28/0268 |
| 2021/0297893 A1* | 9/2021 | Hallenstål | H04W 80/04 |

FOREIGN PATENT DOCUMENTS

| | | |
|---|---|---|
| CN | 102710464 A | 10/2012 |
| CN | 104009878 A | 8/2014 |
| CN | 106162728 A | 11/2016 |
| WO | 2012009987 A1 | 1/2012 |
| WO | 2017034274 A1 | 3/2017 |

OTHER PUBLICATIONS

International Search Report in the international application No. PCT/CN2018/099263, dated Apr. 2, 2019.

"3GPP; Technical Specification Group Services and System Aspects; Study on enhancement of Ultra-Reliable Low-Latency Communication (URLLC) support in 5GC (Release 16)", 3GPP TR 23.725, No. V0.3.0, Jul. 23, 2018, 44 pages.

Supplementary European Search Report in European application No. 18929061.2, dated Jun. 23, 2021. 11 pages.

First Office Action of the Chinese application No. 202010591936.1, dated Jul. 23, 2021. 37 pages with English translation.

English translation of the Written Opinion of the International Search Authority in the international application No. PCT/CN2018/099263, dated Apr. 2, 2019. 10 pages.

First Office Action of the Canadian application No. 3108685, dated Feb. 25, 2022. 5 pages.

First Office Action of the European application No. 18929061.2, dated Apr. 4, 2022. 5 pages.

Office Action of the Indian application No. 202127006428, dated Apr. 29, 2022. 5 pages with English Translation.

First Office Action of the Japanese application No. 2021-506459, dated Jul. 22, 2022. 5 pages with English translation.

\* cited by examiner

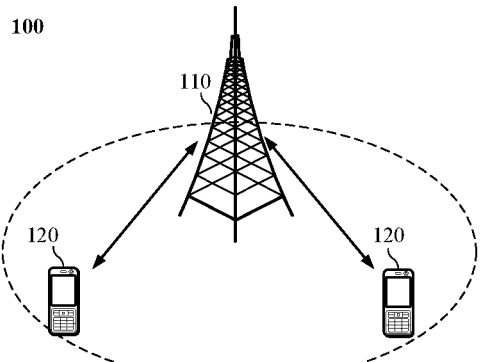

FIG. 1

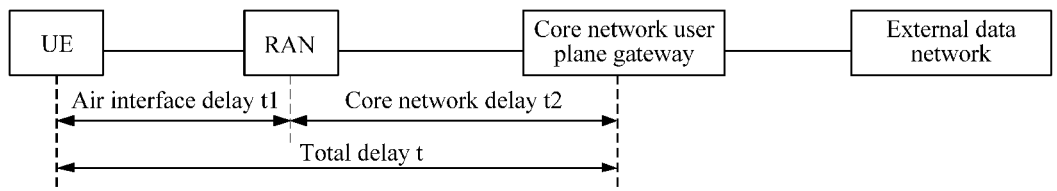

FIG. 2

Send, by a first node, a first data packet to a second node, the first data packet carrying at least one kind of the following information: first identification information, first sequence number information, and first timestamp information, the first identification information being used for indicating that the second node returns a second data packet after receiving the first data packet, the first sequence number information being used for identifying the first data packet, and the first timestamp information being used for indicating information about a time at which the first node sends the first data packet

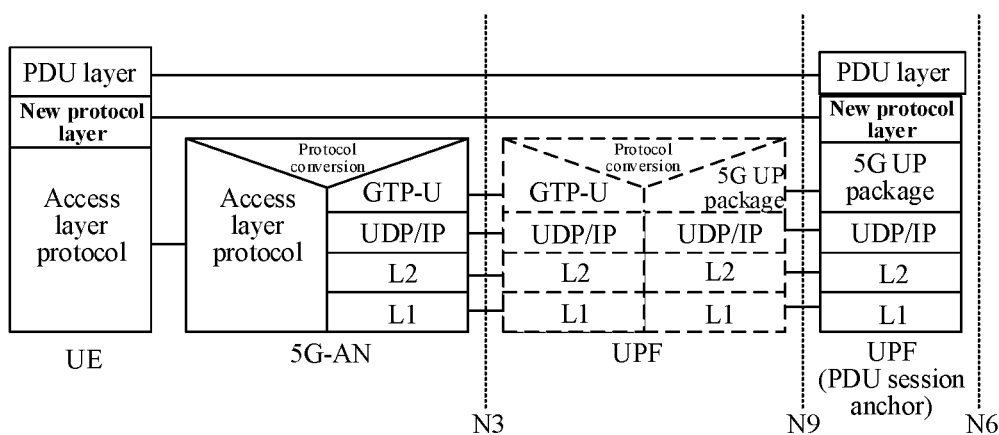

FIG. 4

Receive, by a second node, a first data packet sent by a first node, the first data packet carrying at least one kind of the following information: first identification information, first sequence number information, and first timestamp information, the first identification information being used for indicating that the second node returns a second data packet after receiving the first data packet, the first sequence number information being used for identifying the first data packet, and the first timestamp information being used for indicating information about a time at which the first node sends the first data packet ⟶ 501

FIG. 5

Send, by a first node, a first data packet to a second node via a first access network element, the first data packet transmitted between the first node and the first access network element carrying at least one kind of the following information: first identification information, first sequence number information, and first timestamp information, and the first data packet transmitted between the first access network element and the second node carrying at least one kind of the following information: first identification information, first sequence number information, first timestamp information, and second timestamp information ⟶ 601

FIG. 6

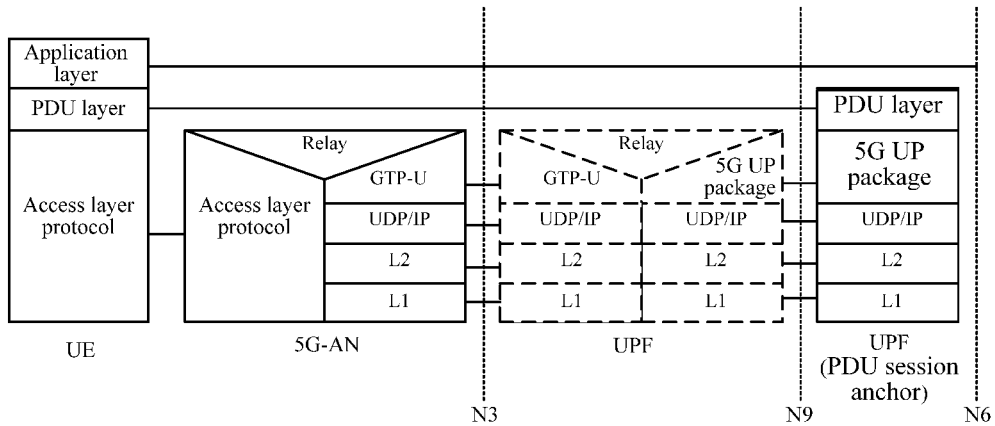

FIG. 7

Receive, by a second node, a first data packet sent by a first node via a first access network element, the first data packet transmitted between the first node and the first access network element carrying at least one kind of the following information: first identification information, first sequence number information, and first timestamp information, and the first data packet transmitted between the first access network element and the second node carrying at least one kind of the following information: first identification information, first sequence number information, first timestamp information, and second timestamp information ⟶ 801

FIG. 8

Receive, by a first node, first information sent by a second node, and determine a transmission delay requirement based on the first information, the transmission delay requirement including an upper limit requirement and/or a lower limit requirement for a transmission delay — 901
FIG. 9
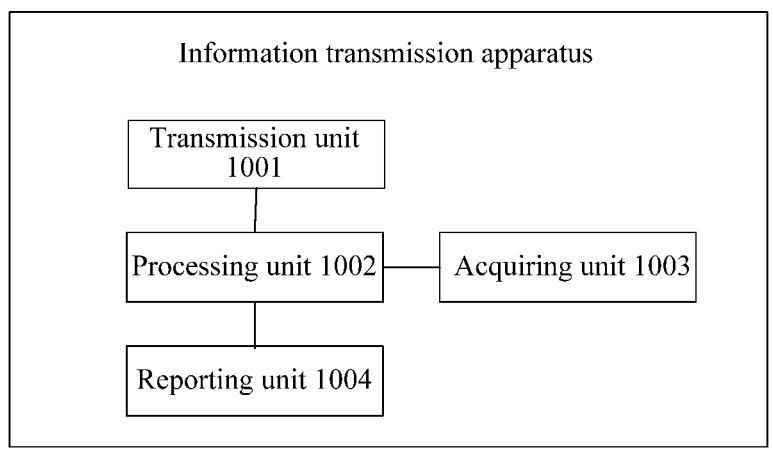
FIG. 10
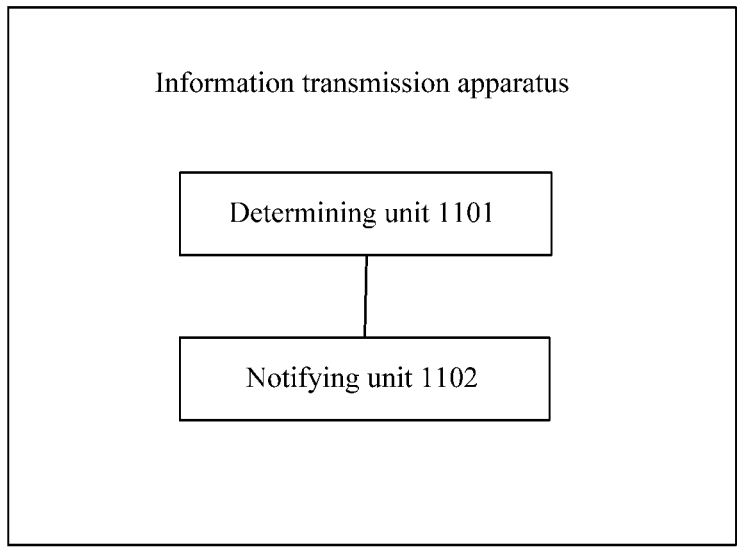
FIG. 11

INFORMATION TRANSMISSION METHOD AND APPARATUS, AND COMMUNICATION DEVICE

CROSS-REFERENCE TO RELATED APPLICATION

This is a continuation application of International Patent Application No. PCT/CN2018/099263, filed on Aug. 7, 2018, the contents of which are hereby incorporated by reference in its entirety.

BACKGROUND

Ultra-reliable and low latency communication (URLLC) is an important communication method in the future, of which requirements for an end-to-end communication delay are generally in the millisecond level. A URLLC transmission delay mainly consists of two parts, that is, a transmission delay of an air interface and a transmission delay of a core network. A transmission delay from the core network to an external network is generally not defined. However, during delay measurement, the most valuable and practical method is to measure only a delay between a terminal and the core network. How to accurately measure the delay between the terminal and the core network is a problem to be resolved.

SUMMARY

Embodiments of this disclosure relate to the field of mobile communication technologies, and in particular, to an information transmission method and apparatus.

An information transmission method provided in an embodiment of this disclosure includes:

sending, by a first node, a first data packet to a second node, the first data packet being used for measuring a one-way delay, and/or receiving a second data packet returned by the second node, the second data packet being used for measuring a round-trip delay.

The information transmission method provided in the embodiment of this disclosure includes:

sending, by a first node, a first data packet to a second node via a first access network element, the first data packet being used for measuring a one-way transmission delay, and/or receiving a second data packet returned by the second node via the first access network element, the second data packet being used for measuring a round-trip transmission delay.

The information transmission method provided in the embodiment of this disclosure includes:

receiving, by a first node, first information sent by a second node, and determining a transmission delay requirement based on the first information, the transmission delay requirement including an upper limit requirement and/or a lower limit requirement for a transmission delay.

An information transmission apparatus provided in an embodiment of this disclosure and applied to a first node, the apparatus including:

a transmission unit configured to send a first data packet to a second node, the first data packet being used for measuring a one-way delay, and/or receiving a second data packet returned by the second node, the second data packet being used for measuring a round-trip delay.

An information transmission apparatus provided in an embodiment of this disclosure and applied to a first node, the apparatus including:

a transmission unit configured to send a first data packet to a second node via a first access network element, the first data packet being used for measuring a one-way transmission delay, and/or receiving a second data packet returned by the second node via the first access network element, the second data packet being used for measuring a round-trip transmission delay.

An information transmission apparatus provided in the embodiment of this disclosure and applied to a first node, the apparatus including:

a determining unit configured to receive first information sent by a second node, and determine a transmission delay requirement based on the first information, the transmission delay requirement including an upper limit requirement and/or a lower limit requirement for a transmission delay.

The information transmission method provided in the embodiment of this disclosure includes:

acquiring, by a first node, first information from a core network, the first information being used to determine a first delay threshold and a second delay threshold; and controlling, by the first node, a transmission delay between the first node and a second node to be between the first delay threshold and the second delay threshold.

The information transmission apparatus provided in the embodiment of this disclosure includes:

an acquiring unit configured to acquire first information from a core network, the first information being used to determine a first delay threshold and a second delay threshold; and a processing unit configured to control a transmission delay between the first node and a second node to be between the first delay threshold and the second delay threshold.

A communication device provided in an embodiment of this disclosure includes a processor and a memory. The memory is configured to store a computer program, and the processor is configured to call and run the computer program stored in the memory to perform the foregoing information transmission method.

A chip provided in an embodiment of this disclosure is configured to implement the foregoing information transmission method.

Specifically, the chip includes a processor for calling and running a computer program from a memory, so that a device installed with the chip performs the foregoing information transmission method.

A computer-readable storage medium provided in an embodiment of this disclosure is configured to store a computer program, the computer program causing a computer to perform the foregoing information transmission method.

A computer program product provided in an embodiment of this disclosure includes a computer program instruction, the computer program instruction causing a computer to perform the foregoing information transmission method.

A computer program provided in an embodiment of this disclosure causes, when running on a computer, the computer to perform the foregoing information transmission method.

According to the technical solution of the embodiment of this disclosure, a new protocol layer (that is, a first protocol layer) is established between the terminal and the core network, and information in the protocol layer is used to complete delay measurement; or an SDAP layer protocol and/or a PDCP layer protocol are/is extended between a base station and the terminal, and the information in the protocol layer is used to complete the delay measurement. Therefore, delays of different paths may be measured dynamically.

BRIEF DESCRIPTION OF THE DRAWINGS

The accompanying drawings described here are used to provide a further understanding of the present disclosure and constitute a part of the present disclosure. The schematic embodiments of the present disclosure and the description thereof are used to explain the present disclosure, and do not constitute an improper limitation on the present disclosure. In the accompanying drawings:

FIG. 1 is a schematic diagram of a communication system architecture according to an embodiment of this disclosure;

FIG. 2 is a schematic diagram of a delay according to an embodiment of this disclosure;

FIG. 3 is a schematic flowchart I of an information transmission method according to an embodiment of this disclosure;

FIG. 4 is a schematic diagram I of a user plane protocol stack according to an embodiment of this disclosure;

FIG. 5 is a schematic flowchart II of an information transmission method according to an embodiment of this disclosure;

FIG. 6 is a schematic flowchart III of an information transmission method according to an embodiment of this disclosure;

FIG. 7 is a schematic diagram II of a user plane protocol stack according to an embodiment of this disclosure;

FIG. 8 is a schematic flowchart IV of an information transmission method according to an embodiment of this disclosure;

FIG. 9 is a schematic flowchart V of an information transmission method according to an embodiment of this disclosure;

FIG. 10 is a schematic structural diagram I of an information transmission apparatus according to an embodiment of this disclosure;

FIG. 11 is a schematic structural diagram II of an information transmission apparatus according to an embodiment of this disclosure;

DETAILED DESCRIPTION

Figure 12:
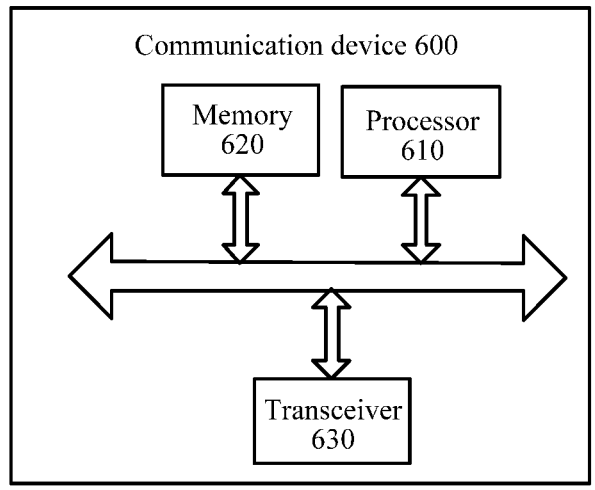
FIG. 12 is a schematic structural diagram of a communication device according to an embodiment of this disclosure.

The technical solutions in the embodiments of the present disclosure will be described below with reference to the accompanying drawings in the embodiments of the present disclosure. Obviously, the described embodiments are part of the embodiments of the present disclosure, but not all of the embodiments. Based on the embodiments in the present disclosure, all other embodiments obtained by a person of ordinary skill in the art without creative efforts shall fall within the protection scope of the present disclosure.

The technical solutions in the embodiments of the present disclosure can be applied to various communication systems, for example, a global system of mobile communication (GSM) system, a code division multiple access (CDMA) system, and a wideband code division multiple access (WCDMA) system, a general packet radio service (GPRS), a long term evolution (LTE) system, an LTE frequency division duplex (FDD) system, an LTE time division duplex (TDD), a universal Mobile telecommunication system (UMTS), a worldwide interoperability for microwave access (WiMAX) communication system or a 5G system, etc.

For example, a communication system 100 applied in the embodiment of this disclosure is shown in FIG. 1. The communication system 100 may include a network device 110, and the network device 110 may be a device that communicates with a terminal device 120 (or referred to as a communication terminal or a terminal). The network device 110 may provide communication coverage for a specific geographic area, and may communicate with a terminal device located in the coverage area. Optionally, the network device 110 may be a base transceiver station (BTS) in a GSM system or a CDMA system, or may be a NodeB (NB) in a WCDMA system, or an evolved Node B (eNB, or eNodeB) in an LTE system, or a wireless controller in a cloud radio access network (CRAN), or the network device may be a mobile switching center, a relay station, an access point, a vehicle-mounted device, a wearable device, a hub, a switch, a bridge, a router, a network-side device in a 5G network, a network device in a public land mobile network (PLMN) that evolves in the future, or the like.

The communication system 100 further includes at least one terminal device 120 located within the coverage area of the network device 110. The "terminal device" used herein includes, but is not limited to, connection via a wired line such as a public switched telephone network (PSTN), a digital subscriber line (DSL), a digital cable, and a direct cable; and/or another data connection/network; and/or connection via a wireless interface, such as for a cellular network, a wireless local area network (WLAN), a digital television network such as a DVB-H network, a satellite network, an AM-FM broadcast transmitter; and/or another terminal device configured to receive/send a communication signal; and/or an Internet of Things (IoT) device. A terminal device configured to communicate through a wireless interface may be referred to as a "wireless communication terminal", a "wireless terminal", or a "mobile terminal". An example of the mobile terminal includes, but is not limited to, a satellite or cellular phone; a personal communications system (PCS) terminal that can combine a cellular radiotelephone with data processing, facsimile, and data communications capabilities; may include a radiotelephone, a pager, Internet/Intranet access, a web browser, a notepad, a calendar, and/or a PDA of the Global Positioning System (GPS) receiver; and a conventional laptop and/or palm-type receiver or other electronic apparatuses including a radiotelephone transceiver. The terminal device may be an access terminal, a user equipment (UE), a user unit, a subscriber station, a mobile station, a mobile console, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a wireless local loop (WLL) station, a personal digital assistant (PDA), a handheld device with a wireless communication function, a computing device, or other processing devices connected to a wireless modem, an in-vehicle device, a wearable device, a terminal device in a 5G network, or a network device in the PLMN that evolves in the future.

Optionally, device-to-device (D2D) communication may be performed between the terminal devices 120.

Optionally, the 5G system or the 5G network may also be referred to as a New Radio (NR) system or an NR network.

FIG. 1 exemplarily shows one network device and two terminal devices. Optionally, the communication system 100 may include a plurality of network devices, and the coverage area of each network device may include other numbers of terminal devices, which is not limited in the embodiment of this disclosure.

Optionally, the communication system 100 may further include other network entities such as a network controller, a mobility management entity and the like, which is not limited in the embodiment of this disclosure.

It should be understood that the device having a communication function in the network/system in the embodiments of this disclosure may be referred to as a communication device. The communication system 100 shown in FIG. 1 is used as an example. The communication device may include a network device 110 and a terminal device 120 having a communication function, and the network device 110 and the terminal device 120 may be specific devices described above, and are not described herein again. The communication device may also include other devices in the communication system 100, such as other network entities such as a network controller, a mobility management entity, and the like, which is not limited in the embodiment of this disclosure.

It should be understood that the terms "system" and "network" are often used interchangeably herein. The term "and/or" in this paper is merely an association relationship describing related objects, which means that there may be three relationships, for example, A and/or B may indicate three cases: A exists alone, A and B exist simultaneously, and B exists alone. In addition, the character "/" in this paper generally indicates that the related objects are in an "or" relationship.

In order to facilitate understanding of the technical solutions of the embodiments of this disclosure, related technologies of the embodiments of this disclosure are described below.

Referring to FIG. 2, a transmission delay mainly consists of two parts, that is, a transmission delay t1 of an air interface and a transmission delay t2 of a core network. A transmission delay from the core network to an external network is generally not defined.

At present, a URLLC transmission delay is generally in the millisecond level, such as 1 ms, 5 ms, 10 ms, and so on. The delay t1 of the air interface is currently specified as 1 ms, 10 ms, etc., while the transmission delay of the core network includes 1 ms, 2 ms, 5 ms, and the like. It may be learned that the delay of the air interface generally has different levels, and is not flexibly specified to 1 ms, 1.1 ms, 1.2 ms and so on. For example, if the transmission delay of URLLC is 5 ms and t2=4 ms, then t1 must be 1 ms; but if t2 is now 3.5 ms, then t1 may be extended to 1.5 ms, which does not make much sense for air interface design, because the transmission delay of the air interface is either 1 ms or 10 ms, 1.5 ms cannot be ensured.

According to the foregoing characteristics, the most valuable and practical method for measuring a delay is to measure only the delay between the UE and the core network without measuring t1 and t2. If t1 and t2 are measured specifically, there may be the following two questions.

1. As mentioned in the previous paragraph, this does not make much sense. Even if t1 is extended by less than 1 ms, the delay of the air interface still needs to follow the requirement of 1 ms.

2. Measurement may bring in additional processing and destroy accuracy of the measurement. During the measurement, a base station needs to perform additional processing actions (for example, attaching a timestamp, calculating the difference between the last timestamp and the current time) on the measured data packet. In addition, strict time synchronization is further required, which is difficult to realize.

Since the URLLC experiment is in a low level (millisecond level), any error in the additional processing action or a smile may affect the accuracy and value of the measurement.

In general, there are two methods for calculating a delay from a CN gateway to the UE.

1. The CN gateway sends a data packet to the UE, and measures a round-trip time of the data packet, where t=round-trip delay/2.

2. The CN gateway attaches a timestamp t01 when sending the data packet, and when the UE calculates t=t02−t01 according to the time t02 when receiving the data packet.

Because the delay t2 is generally set to a fixed value, such as 1 ms, 2 ms, 5 ms, t1=t/set t2, or t1=T1 (a UPF timestamp)−T2 (a UE timestamp) is simply calculated. In this way, it may be estimated whether there is a qualitative change at the time t1, otherwise only a change of less than 1 ms does not require any change on the RAN side.

FIG. 3 is a schematic flowchart 1 of an information transmission method according to an embodiment of this disclosure. As shown in FIG. 3, the information transmission method includes the following step.

Step 301: A first node sends a first data packet to a second node, the first data packet being used for measuring a one-way delay, and/or receiving a second data packet returned by the second node, the second data packet being used for measuring a round-trip delay.

In the embodiment of this disclosure, the implementation of the first node and the second node may be as follows.

(1) The first node is a first core network element, and the second node is a terminal;

(2) The first node is the terminal, and the second node is the first core network element;

(3) The first node is the first core network element, and the second node is a first access network element; and (4) The first node is the first access network element, and the second node is the first core network element.

In the embodiment of this disclosure, for a physical function of each network element, a 5G communication system is used as an example. The first core network element refers to a UPF, the second core network element refers to an SMF, a third core network element refers to a PCF, and a fourth core network element refers to an AMF.

In the embodiment of this disclosure, the first data packet carries at least one kind of the following information: first identification information, second identification information, first sequence number information, and first timestamp information, the first identification information being used for indicating that the first data packet is used for measurement, the second identification information being used for indicating that the second node returns the second data packet after receiving the first data packet, the first sequence number information being used for identifying the first data packet, and the first timestamp information being used for indicating information about a time at which the first node sends the first data packet.

In the embodiment of this disclosure, the first sequence number information is, for example, an SN to be used for distinguishing different data packets.

In the embodiment of this disclosure, the first data packet sent by the first node to the second node may carry the first identification information and/or the second identification information. The second node identifies the first identification information after receiving the first data packet, considers that the first data packet is used for measurement, and immediately returns the second data packet when the second identification information is identified. The first node may calculate information about a round-trip delay between the two nodes according to first timestamp information of sending the first data packet and third timestamp information of receiving the second data packet, and information about the one-way delay may be obtained through dividing the information about the round-trip delay by 2.

In the embodiment of this disclosure, the first data packet sent by the first node to the second node may carry the first sequence number information. A function of the first sequence number information may be to identify the first data packet, and may also have a same function as the first identification information. The second node identifies the first sequence number information after receiving the first data packet, and immediately returns the second data packet. The first node may calculate information about a round-trip delay between the two nodes according to first timestamp information of sending the first data packet and third timestamp information of receiving the second data packet, and information about the one-way delay may be obtained through dividing the information about the round-trip delay by 2.

In the embodiment of this disclosure, the first data packet sent by the first node to the second node may carry the first timestamp information of sending the first data packet. After receiving the first data packet, the second node may calculate information about the one-way delay between the two nodes according to the first timestamp information of sending the first data packet and second timestamp information of receiving the first data packet.

In the embodiment of this disclosure, the first data packet sent by the first node to the second node may carry any one or more of the foregoing three kinds of information.

In an implementation, the second data packet carries at least one kind of the following information: first identification information, second identification information, second sequence number information, first timestamp information, and second timestamp information, the second sequence number information being used for identifying the second data packet, the second sequence number information being the same as the first sequence number information or having a correspondence with the first sequence number information, the second timestamp information being used for indicating information about a time at which the second node sends the second data packet to the first node and/or information about a time at which the first data packet is received from the first node.

In the embodiment of this disclosure, the second data packet sent by the second node to the first node may carry any one or more of the foregoing three kinds of information.

In an implementation, after the first node receives the second data packet sent by the second node, the method further includes:

determining information about a delay between the first node and the second node based on the first timestamp information and third timestamp information, the third timestamp information being used for indicating information about a time at which the first node receives the second data packet; and/or determining information about a delay between the first node and the second node based on the first timestamp information and the second timestamp information or the third timestamp information and the second timestamp information.

The following describes how the information in the first data packet and the second data packet is carried in combination with different implementations of the first node and the second node.

(1) The first node is a first core network element, and the second node is a terminal;

information carried in the first data packet being added through a first protocol layer of the first node, the first protocol layer being located above a GTP-U layer; and information carried in the second data packet being added through a first protocol layer of the second node, the first protocol layer being located above an SDAP layer.

Referring to FIG. 4, the first protocol layer is a new protocol layer, and the first data packet is transparently transmitted through a 5G-AN, that is, the 5G-AN does not perceive the new protocol layer of the first data packet.

(2) The first node is the terminal, and the second node is the first core network element;

information carried in the first data packet being added through a first protocol layer of the first node, the first protocol layer being located above an SDAP layer; and information carried in the second data packet being added through a first protocol layer of the second node, the first protocol layer being located above a GTP-U layer.

Referring to FIG. 4, the first protocol layer is a new protocol layer, and the first data packet is transparently transmitted through a 5G-AN, that is, the 5G-AN does not perceive the new protocol layer of the first data packet.

(3) The first node is the first core network element, and the second node is a first access network element;

information carried in the first data packet being added through a GTP-U layer of the first node; and information carried in the second data packet being added through a GTP-U layer of the second node.

(4) The first node is the first access network element, and the second node is the first core network element;

information carried in the first data packet being added through a GTP-U layer of the first node; and information carried in the second data packet being added through a GTP-U layer of the second node.

Referring to FIG. 4, an access layer protocol on the UE and the 5G-AN side includes an SDAP layer, a PDCP layer, an RLC layer, a MAC layer, and a PHY layer from top to bottom.

The technical solutions of the embodiments of this disclosure further include: the first node acquires a first rule from a second core network element, and reports, based on the first rule, delay information and/or a first notification message obtained through measurement. The first rule on the second core network element side is notified by a third core network element to the second core network element or preconfigured by the second core network element.

The first rule herein includes at least one kind of the following:

first information, the first information being used for indicating whether a measurement behavior for delay information is triggered by the first node and/or the second node, for example, whether the measurement behavior is triggered by the UPF and/or the UE;

second information, the second information being used for indicating a measurement period or a measurement time point corresponding to the measurement behavior for the delay information;

third information, the third information being used for indicating whether a measurement result is reported for each measurement behavior;

fourth information, the fourth information including a delay exceeding a first delay threshold and/or a delay being lower than a second delay threshold; and fifth information, the fifth information being used for indicating to report a corresponding measurement result when delay information obtained through measurement exceeds the first delay threshold or is lower than the second delay threshold.

In the embodiment of this disclosure, at least one kind of information in the first rule is sent to the first node in a dynamic manner or in a static manner.

The dynamic manner means that the first node receives complete content of at least one kind of information in the first rule; for example, the first node receives at least one kind of information in a QoS rule and the first rule together.

The static manner means that the first node stores a correspondence between at least one kind of information in the first rule and first indication information, and the first node receives the first indication information, and determines at least one kind of information in the first rule based on the first indication information.

Further, the first indication information is included in a QoS parameter, and is sent by the second node to the first node through establishing a PDU session and/or an update process. For example, the first indication information is a 5QI parameter in the QoS parameter. For example, when the QoS parameter is delivered to the base station and the UE, 5QI=3 in the QoS parameter, that is, an end-to-end delay is 50 ms, and jitter (fourth/fifth information) corresponding to the parameter is [−3 ms, +5 ms], that is, the end-to-end delay (between the UPF and the UE) is not lower than (50-3) ms and not higher than (50+5) ms.

(1) When the first node is a first core network element, the first node reports, through an N4 interface, delay information and/or a first notification message obtained through measurement to the second core network element and/or the third core network element, the first notification message being used for indicating that the measurement behavior does not satisfy at least one item in the first rule. For example, the first notification message is used to indicate that the delay information obtained through measurement exceeds a first delay threshold or is lower than a second delay threshold.

Specifically, the UPF reports the delay information and/or the first notification message to the SMF through the N4 interface, and then the SMF determines whether to report the delay information and/or the first notification message to the PCF.

(2) When the first node is a terminal, the first node carries the delay information and/or the first notification message obtained through measurement in a first container of a NAS message, and reports the delay information and/or the first notification message to the second core network element through an N1 interface; or the first node carries the delay information and/or the first notification message obtained through measurement in a NAS message, and reports the delay information and/or the first notification message to the second core network element, the second core network element herein being an SMF, and the SMF forwarding the delay information and/or the first notification message to the PCF; or the first node carries the delay information and/or the first notification message obtained through measurement in a user plane data packet, and reports the delay information and/or the first notification message to the first core network element, the first core network element herein being a UPF, and the UPF forwarding the delay information and/or the first notification message to the SMF and/or PCF, where the first notification message is used for indicating that the measurement behavior does not satisfy at least one item in the first rule.

In the foregoing solution, the user plane data packet includes a first data stream data packet and/or a second data packet. A first data stream means that a data packet of a certain data stream is only used for reporting.

Specifically, the UE stores content of the delay information and/or the first notification message in a container, and reports the content to an AMF on the N1 interface through the NAS message, the AMF forwarding the content to the PCF, and the PCF further notifying the content to the SMF (if necessary). Alternatively, the UE directly sends the delay information and/or the first notification message to the AMF through an SM-NAS message, where the AMF forwards content of the SM-NAS to the PCF.

(3) When the first node is a first access network element, the first node directly reports the delay information and/or the first notification message obtained through measurement to the first core network element or the second core network element, the first notification message being used for indicating that the measurement behavior does not satisfy at least one item in the first rule.

Herein, the first node reports, through a control plane data packet, the delay information and/or the first notification message obtained through measurement to the second core network element; or the first node reports, through a user plane data packet, the delay information and/or the first notification message obtained through measurement to the first core network element. Specifically, a gNB directly reports the delay information and/or the first notification message to the UPF (a user plane) or SMF (a control plane).

FIG. 5 is a schematic flowchart II of an information transmission method according to an embodiment of this disclosure. As shown in FIG. 5, the information transmission method includes the following step.

Step 501: A second node receives a first data packet sent by a first node, the first data packet being used for measuring a one-way delay, and/or sends a second data packet to the second node, the second data packet being used for measuring a round-trip delay.

In the embodiment of this disclosure, the implementation of the first node and the second node may be as follows.

(1) The first node is a first core network element, and the second node is a terminal;

(2) The first node is the terminal, and the second node is the first core network element;

(3) The first node is the first core network element, and the second node is a first access network element; and (4) The first node is the first access network element, and the second node is the first core network element.

In the embodiment of this disclosure, for a physical function of each network element, a 5G communication system is used as an example. The first core network element refers to a UPF, the second core network element refers to an SMF, a third core network element refers to a PCF, and a fourth core network element refers to an AMF.

In the embodiment of this disclosure, the first data packet carries at least one kind of the following information: first identification information, second identification information, first sequence number information, and first timestamp information, the first identification information being used for indicating that the first data packet is used for measurement, the second identification information being used for indicating that the second node returns the second data packet after receiving the first data packet, the first sequence number information being used for identifying the first data packet, and the first timestamp information being used for indicating information about a time at which the first node sends the first data packet.

In the embodiment of this disclosure, the first data packet sent by the first node to the second node may carry any one or more of the foregoing three kinds of information.

In the embodiment of this disclosure, the second data packet carries at least one kind of the following information: first identification information, second identification information, second sequence number information, first timestamp information, and second timestamp information, the second sequence number information being used for identifying the second data packet, the second sequence number information being the same as the first sequence number information or having a correspondence with the first sequence number information, the second timestamp information being used for indicating information about a time at which the second node sends the second data packet to the first node and/or information about a time at which the first data packet is received from the first node.

In the embodiment of this disclosure, the second data packet sent by the second node to the first node may carry any one or more of the foregoing three kinds of information.

In an implementation, after receiving the first data packet sent by the first node, the second node determines information about a delay between the first node and the second node based on the first timestamp information and the second timestamp information, the second timestamp information being used for indicating information about a time at which the second node sends the second data packet to the first node and/or information about a time at which the first data packet is received from the first node.

The following describes how the information in the first data packet and the second data packet is carried in combination with different implementations of the first node and the second node.

(1) The first node is a first core network element, and the second node is a terminal;
  information carried in the first data packet being added through a first protocol layer of the first node, the first protocol layer being located above a GTP-U layer; and
  information carried in the second data packet being added through a first protocol layer of the second node, the first protocol layer being located above an SDAP layer.

(2) The first node is the terminal, and the second node is the first core network element;
  information carried in the first data packet being added through a first protocol layer of the first node, the first protocol layer being located above an SDAP layer; and
  information carried in the second data packet being added through a first protocol layer of the second node, the first protocol layer being located above a GTP-U layer.

(3) The first node is the first core network element, and the second node is a first access network element;
  information carried in the first data packet being added through a GTP-U layer of the first node; and
  information carried in the second data packet being added through a GTP-U layer of the second node.

(4) The first node is the first access network element, and the second node is the first core network element;
  information carried in the first data packet being added through a GTP-U layer of the first node; and
  information carried in the second data packet being added through a GTP-U layer of the second node.

The technical solutions of the embodiments of this disclosure further include: the second node acquires a first rule from a second core network element, and reports, based on the first rule, delay information and/or a first notification message obtained through measurement. The first rule on the second core network element side is notified by a third core network element to the second core network element or preconfigured by the second core network element.

The first rule herein includes at least one kind of the following:
  first information, the first information being used for indicating whether a measurement behavior for delay information is triggered by the first node and/or the second node, for example, whether the measurement behavior is triggered by the UPF and/or the UE;
  second information, the second information being used for indicating a measurement period or a measurement time point corresponding to the measurement behavior for the delay information;
  third information, the third information being used for indicating whether a measurement result is reported for each measurement behavior;
  fourth information, the fourth information including a delay exceeding a first delay threshold and/or a delay being lower than a second delay threshold; and
  fifth information, the fifth information being used for indicating to report a corresponding measurement result when delay information obtained through measurement exceeds the first delay threshold or is lower than the second delay threshold.

In the embodiment of this disclosure, at least one kind of information in the first rule is sent to the first node in a dynamic manner or in a static manner.

The dynamic manner means that the first node receives complete content of at least one kind of information in the first rule; and The static manner means that the first node stores a correspondence between at least one kind of information in the first rule and first indication information, and the first node receives the first indication information, and determines at least one kind of information in the first rule based on the first indication information.

Further, the first indication information is included in a QoS parameter, and is sent by the second node to the first node through establishing a PDU session and/or an update process. For example, the first indication information is a 5QI parameter in the QoS parameter. For example, when the QoS parameter is delivered to the base station and the UE, 5QI=3 in the QoS parameter, that is, an end-to-end delay is 50 ms, and jitter (fourth/fifth information) corresponding to the parameter is [−3 ms, +5 ms], that is, the end-to-end delay (between the UPF and the UE) is not lower than (50-3) ms and not higher than (50+5) ms.

(1) When the second node is a first core network element, the second node reports, through an N4 interface, delay information and/or a first notification message obtained through measurement to the second core network element and/or the third core network element, the first notification message being used for indicating that the measurement behavior does not satisfy at least one item in the first rule. For example, the first notification message is used to indicate that the delay information obtained through measurement exceeds a first delay threshold or is lower than a second delay threshold.

Specifically, the UPF reports the delay information and/or the first notification message to the SMF through the N4 interface, and then the SMF determines whether to report the delay information and/or the first notification message to the PCF.

(2) When the second node is a terminal, the second node carries the delay information and/or the first notification message obtained through measurement in a first container of a NAS message, and reports the delay information and/or the first notification message to the second core network element through an N1 interface; or the second node carries the delay information and/or the first notification message obtained through measurement in a NAS message, and reports the delay information and/or the first notification message to the second core network element, the second core network element herein being an SMF, and the SMF forwarding the delay information and/or the first notification message to the PCF; or the second node carries the delay information and/or the first notification message obtained through measurement in a user plane data packet, and reports the delay information and/or the first notification message to the first core network element, the first core network element herein being a UPF, and the UPF forwarding the delay information and/or the first notification message to the SMF and/or PCF, where the first notification message is used for indicating that the measurement behavior does not satisfy at least one item in the first rule.

In the foregoing solution, the user plane data packet includes a first data stream data packet and/or a second data packet. A first data stream means that a data packet of a certain data stream is only used for reporting.

Specifically, the UE stores content of the delay information and/or the first notification message in a container, and reports the content to an AMF on the N1 interface through the NAS message, the AMF forwarding the content to the PCF, and the PCF further notifying the content to the SMF (if necessary). Alternatively, the UE directly sends the delay information and/or the first notification message to the AMF through an SM-NAS message, where the AMF forwards content of the SM-NAS to the PCF.

(3) When the second node is a first access network element, the second node directly reports the delay information and/or the first notification message obtained through measurement to the first core network element or the second core network element.

Herein, the first node reports, through a control plane data packet, the delay information and/or the first notification message obtained through measurement to the second core network element; or the first node reports, through a user plane data packet, the delay information and/or the first notification message obtained through measurement to the first core network element. Specifically, a gNB directly reports the delay information and/or the first notification message to the UPF (a user plane) or SMF (a control plane).

FIG. 6 is a schematic flowchart III of an information transmission method according to an embodiment of this disclosure. As shown in FIG. 6, the information transmission method includes the following step.

Step 601: A first node sends a first data packet to a second node via a first access network element, the first data packet being used for measuring a one-way transmission delay, and/or receiving a second data packet returned by the second node via the first access network element, the second data packet being used for measuring a round-trip transmission delay.

In the embodiment of this disclosure, the implementation of the first node and the second node may be as follows.

(1) The first node is a first core network element, and the second node is a terminal.

(2) The first node is the terminal, and the second node is the first core network element.

In the embodiment of this disclosure, for a physical function of each network element, a 5G communication system is used as an example. The first core network element refers to a UPF, the second core network element refers to an SMF, a third core network element refers to a PCF, and a fourth core network element refers to an AMF.

In the embodiment of this disclosure, the first data packet transmitted between the first node and the first access network element carries at least one kind of the following information: first identification information, second identification information, first sequence number information, and first timestamp information, and the first data packet transmitted between the first access network element and the second node carries at least one kind of the following information: first identification information, second identification information, first sequence number information, first timestamp information, and second timestamp information; the first identification information being used for indicating that the first data packet is used for measurement; the second identification information being used for indicating that the second node returns a second data packet after receiving the first data packet, the first sequence number information being used for identifying the first data packet, the first timestamp information being used for indicating information about a time at which the first node sends the first data packet, and the second timestamp information being used for indicating information about a time at which the first access network element receives the first data packet from the first node and/or information about a time at which the first data packet is sent to the second node.

In the embodiment of this disclosure, the first sequence number information is, for example, an SN to be used for distinguishing different data packets.

In an implementation, the second data packet transmitted between the second node and the first access network element carries at least one kind of the following information: first identification information, second identification information, second sequence number information, first timestamp information, second timestamp information, and third timestamp information, and the second data packet transmitted between the first access network element and the first node carries at least one kind of the following information: first identification information, second identification information, second sequence number information, first timestamp information, second timestamp information, third timestamp information, and fourth timestamp information; the second sequence number information being used for identifying the second data packet, the second sequence number information being the same as the first sequence number information or having a correspondence with the first sequence number information, the third timestamp information being used for indicating information about a time at which the second node sends the second data packet to the first access network element and/or information about a time at which the first data packet is received from the first access network element, and the fourth timestamp information being used for indicating information about a time at which the first access network element sends the second data packet to the first node and/or information about a time at which the second data packet is received from the second node.

In the embodiment of this disclosure, after the first node receives the second data packet sent by the first access network element, the method further includes:

determining information about a delay between the first node and the second node based on the first timestamp information and fifth timestamp information, the fifth timestamp information being used for indicating information about a time at which the first node receives the second data packet; and/or determining information about a delay between the first node and the second node based on the first timestamp information and the third timestamp information or the fifth timestamp information and the third timestamp information; and/or determining information about a delay between the second node and the first access network element based on the second timestamp information and the third timestamp information or the third timestamp information and the fourth timestamp information; and/or determining information about a delay between the first node and the first access network element based on the first timestamp information and the second timestamp information or the fourth timestamp information and the fifth timestamp information.

The following describes how the information in the first data packet and the second data packet is carried in combination with different implementations of the first node and the second node.

(1) The first node is a first core network element, and the second node is a terminal;

information carried in the first data packet transmitted between the first node and the first access network element being added through a GTP-U layer of the first node;

information carried in the first data packet transmitted between the first access network element and the second node being added through an SDAP layer and/or a PDCP layer of the first access network element;

information carried in the second data packet transmitted between the second node and the first access network element being added through an SDAP layer and/or a PDCP layer of the second node; and information carried in the second data packet transmitted between the first access network element and the first node being added through a GTP-U layer of the first access network element.

Referring to FIG. 7, an access layer protocol on the UE and the 5G-AN side includes an SDAP layer, a PDCP layer, an RLC layer, a MAC layer, and a PHY layer from top to bottom.

(2) The first node is the terminal, and the second node is the first core network element;

information carried in the first data packet transmitted between the first node and the first access network element being added through an SDAP layer and/or a PDCP layer of the first node;

information carried in the first data packet transmitted between the first access network element and the second node being added through a GTP-U layer of the first access network element;

information carried in the second data packet transmitted between the second node and the first access network element being added through a GTP-U layer of the second node; and information carried in the second data packet transmitted between the first access network element and the first node being added through an SDAP layer and/or a PDCP layer of the first access network element.

Referring to FIG. 7, an access layer protocol on the UE and the 5G-AN side includes an SDAP layer, a PDCP layer, an RLC layer, a MAC layer, and a PHY layer from top to bottom.

The technical solutions of the embodiments of this disclosure further include: the first node acquires a first rule from a second core network element, and reports, based on the first rule, delay information and/or a first notification message obtained through measurement. The first rule on the second core network element side is notified by a third core network element to the second core network element or preconfigured by the second core network element.

The first rule herein includes at least one kind of the following:

first information, the first information being used for indicating whether a measurement behavior for delay information is triggered by the first node and/or the second node, for example, whether the measurement behavior is triggered by the UPF and/or the UE;

second information, the second information being used for indicating a measurement period or a measurement time point corresponding to the measurement behavior for the delay information;

third information, the third information being used for indicating whether a measurement result is reported for each measurement behavior;

fourth information, the fourth information including a delay exceeding a first delay threshold and/or a delay being lower than a second delay threshold; and fifth information, the fifth information being used for indicating to report a corresponding measurement result when delay information obtained through measurement exceeds the first delay threshold or is lower than the second delay threshold.

In the foregoing technical, at least one kind of information in the first rule is sent to the first node in a dynamic manner or in a static manner.

The dynamic manner means that the first node receives complete content of at least one kind of information in the first rule.

The static manner means that the first node stores a correspondence between at least one kind of information in the first rule and first indication information, and the first node receives the first indication information, and determines at least one kind of information in the first rule based on the first indication information.

In the foregoing solution, the first indication information is included in a QoS parameter. Further, the first indication information is a 5QI parameter in the QoS parameter.

(1) When the first node is a first core network element, the first node reports, through an N4 interface, delay information and/or a first notification message obtained through measurement to the second core network element and/or the third core network element, the first notification message being used for indicating that the measurement behavior does not satisfy at least one item in the first rule.

Specifically, the UPF reports the delay information and/or the first notification message to the SMF through the N4 interface, and then the SMF determines whether to report the delay information and/or the first notification message to the PCF.

(2) When the first node is a terminal, the first node carries the delay information and/or the first notification message obtained through measurement in a first container of a NAS message, and reports the delay information and/or the first notification message to the second core network element through an N1 interface; or the first node carries the delay information and/or the first notification message obtained through measurement in a NAS message, and reports the delay information and/or the first notification message to the second core network element; or the first node carries the delay information and/or the first notification message obtained through measurement in a user plane data packet, and reports the delay information and/or the first notification message to the first core network element, where the first notification message is used for indicating that the measurement behavior does not satisfy at least one item in the first rule.

The user plane data packet herein includes a first data stream data packet and/or a second data packet.

Specifically, the UE stores content of the delay information and/or the first notification message in a container, and reports the content to an AMF on the N1 interface through the NAS message, the AMF forwarding the content to the PCF, and the PCF further notifying the content to the SMF (if necessary). Alternatively, the UE directly sends the delay information and/or the first notification message to the AMF through an SM-NAS message, where the AMF forwards content of the SM-NAS to the PCF.

(3) The first access network element directly reports the delay information and/or the first notification message obtained through measurement to the first core network element or the second core network element, the first notification message being used for indicating that the measurement behavior does not satisfy at least one item in the first rule.

The first access network element reports, through a control plane data packet, the delay information and/or the first notification message obtained through measurement to the second core network element; or the first access network element reports, through a user plane data packet, the delay information and/or the first notification message obtained through measurement to the first core network element.

Specifically, a gNB directly reports the delay information and/or the first notification message to the UPF (a user plane) or SMF (a control plane).

(4) When the first node is a terminal, and the second node is the first core network element, the first node sends the delay information and/or the first notification message to the second node through a user plane, and the second node sends the delay information and/or the first notification message to the second core network element and/or a third core network element. (4.1) Further, a data packet carrying the delay information and/or the first notification message includes second indication information, and the second node sends the delay information and/or the first notification message to the second core network element and/or the third core network element after obtaining the second indication information. (4.2) Alternatively, a data packet carrying the delay information and/or a first notification message is transmitted through a first data stream and/or a PDU session, and the second node sends, to the second core network element and/or the third core network element, information in the data packet transmitted through the first data stream and/or the PDU session.

In the foregoing solution, the first core network element, the first access network element, and the terminal may selectively attach a corresponding timestamp in the first data packet and/or the second data packet. On the other hand, the first core network element, the first access network element, and the terminal may also calculate corresponding delay information according to the timestamp information in the first data packet and/or the second data packet. For example, if a timestamp T1 is attached to the UPF in the downlink direction, a timestamp T2 is attached to the base station, a timestamp T3 is attached to the UE, and a timestamp T4 is attached to the base station in the returned uplink direction, and a time received by the UPF is T5, a round-trip delay is D1=T5−T1, a one-way delay is D2=T3−T1; an air interface delay is D3=T3−T2 or D4=T4−T3; a core network delay is D5=T5−T4 or D6=T2−T3.

FIG. 8 is a schematic flowchart IV of an information transmission method according to an embodiment of this disclosure. As shown in FIG. 8, the information transmission method includes the following step.

Step 801: A second node receives a first data packet sent by a first node via a first access network element, the first data packet being used for measuring a one-way transmission delay, and/or send a second data packet to the second node via the first access network element, the second data packet being used for measuring a round-trip transmission delay.

In the embodiment of this disclosure, the implementation of the first node and the second node may be as follows.

(1) The first node is a first core network element, and the second node is a terminal.

(2) The first node is the terminal, and the second node is the first core network element.

In the embodiment of this disclosure, for a physical function of each network element, a 5G communication system is used as an example. The first core network element refers to a UPF, the second core network element refers to an SMF, a third core network element refers to a PCF, and a fourth core network element refers to an AMF.

In the embodiment of this disclosure, the first data packet transmitted between the first node and the first access network element carries at least one kind of the following information: first identification information, second identification information, first sequence number information, and first timestamp information, and the first data packet transmitted between the first access network element and the second node carries at least one kind of the following information: first identification information, second identification information, first sequence number information, first timestamp information, and second timestamp information; the first identification information being used for indicating that the first data packet is used for measurement; the second identification information being used for indicating that the second node returns a second data packet after receiving the first data packet, the first sequence number information being used for identifying the first data packet, the first timestamp information being used for indicating information about a time at which the first node sends the first data packet, and the second timestamp information being used for indicating information about a time at which the first access network element receives the first data packet from the first node and/or information about a time at which the first data packet is sent to the second node.

In an implementation, after determining that the first data packet carries the first identification information and/or the second identification information and/or the first sequence number information, the second node encapsulates the second data packet and sends the second data packet to the first node via the first access network element.

Specifically, the second data packet transmitted between the second node and the first access network element carries at least one kind of the following information: first identification information, second identification information, second sequence number information, first timestamp information, second timestamp information, and third timestamp information, and the second data packet transmitted between the first access network element and the first node carries at least one kind of the following information: first identification information, second identification information, second sequence number information, first timestamp information, second timestamp information, third timestamp information, and fourth timestamp information; the second sequence number information being used for identifying the second data packet, the second sequence number information being the same as the first sequence number information or having a correspondence with the first sequence number information, the third timestamp information being used for indicating information about a time at which the second node sends the second data packet to the first access network element and/or information about a time at which the first data packet is received from the first access network element, and the fourth timestamp information being used for indicating information about a time at which the first access network element sends the second data packet to the first node and/or information about a time at which the second data packet is received from the second node.

In the embodiment of this disclosure, the second node determines delay information between the first node and the second node based on the information carried in the first data packet; and/or determines delay information between the second node and the first access network element; and/or determines delay information between the first node and the first access network element.

Specifically, after receiving the first data packet sent by the first node via the first access network element, the second node determines delay information between the first node and the second node based on the first timestamp information and the third timestamp information; and/or determines delay information between the second node and the first access network element based on the second timestamp information and the third timestamp information; and/or determines delay information between the first node and the first access network element based on the first timestamp information and the second times tamp information.

The following describes how the information in the first data packet and the second data packet is carried in combination with different implementations of the first node and the second node.

(1) The first node is a first core network element, and the second node is a terminal;

information carried in the first data packet transmitted between the first node and the first access network element being added through a GTP-U layer of the first node;

information carried in the first data packet transmitted between the first access network element and the second node being added through an SDAP layer and/or a PDCP layer of the first access network element;

information carried in the second data packet transmitted between the second node and the first access network element being added through an SDAP layer and/or a PDCP layer of the second node; and information carried in the second data packet transmitted between the first access network element and the first node being added through a GTP-U layer of the first access network element.

Referring to FIG. 7, an access layer protocol on the UE and the 5G-AN side includes an SDAP layer, a PDCP layer, an RLC layer, a MAC layer, and a PHY layer from top to bottom.

(2) The first node is the terminal, and the second node is the first core network element;

information carried in the first data packet transmitted between the first node and the first access network element being added through an SDAP layer and/or a PDCP layer of the first node;

information carried in the first data packet transmitted between the first access network element and the second node being added through a GTP-U layer of the first access network element;

information carried in the second data packet transmitted between the second node and the first access network element being added through a GTP-U layer of the second node; and information carried in the second data packet transmitted between the first access network element and the first node being added through an SDAP layer and/or a PDCP layer of the first access network element.

Referring to FIG. 7, an access layer protocol on the UE and the 5G-AN side includes an SDAP layer, a PDCP layer, an RLC layer, a MAC layer, and a PHY layer from top to bottom.

The technical solutions of the embodiments of this disclosure further include: the second node acquires a first rule from a second core network element, and reports, based on the first rule, delay information and/or a first notification message obtained through measurement. The first rule on the second core network element side is notified by a third core network element to the second core network element or preconfigured by the second core network element.

The first rule herein includes at least one kind of the following:

first information, the first information being used for indicating whether a measurement behavior for delay information is triggered by the first node and/or the second node, for example, whether the measurement behavior is triggered by the UPF and/or the UE;

second information, the second information being used for indicating a measurement period or a measurement time point corresponding to the measurement behavior for the delay information;

third information, the third information being used for indicating whether a measurement result is reported for each measurement behavior;

fourth information, the fourth information including a delay exceeding a first delay threshold and/or a delay being lower than a second delay threshold; and fifth information, the fifth information being used for indicating to report a corresponding measurement result when delay information obtained through measurement exceeds the first delay threshold or is lower than the second delay threshold.

In the foregoing technical, at least one kind of information in the first rule is sent to the first node in a dynamic manner or in a static manner.

The dynamic manner means that the first node receives complete content of at least one kind of information in the first rule.

The static manner means that the first node stores a correspondence between at least one kind of information in the first rule and first indication information, and the first node receives the first indication information, and determines at least one kind of information in the first rule based on the first indication information.

In the foregoing solution, the first indication information is included in a QoS parameter. Further, the first indication information is a 5QI parameter in the QoS parameter.

(1) When the second node is a first core network element, the second node reports, through an N4 interface, delay information and/or a first notification message obtained through measurement to the second core network element and/or the third core network element, the first notification message being used for indicating that the measurement behavior does not satisfy at least one item in the first rule.

Specifically, the UPF reports the delay information and/or the first notification message to the SMF through the N4 interface, and then the SMF determines whether to report the delay information and/or the first notification message to the PCF.

(2) When the second node is a terminal, the second node carries the delay information and/or the first notification message obtained through measurement in a first container of a NAS message, and reports the delay information and/or the first notification message to the second core network element through an N1 interface; or the second node carries the delay information and/or the first notification message obtained through measurement in a NAS message, and reports the delay information and/or the first notification message to the second core network element; or the second node carries the delay information and/or the first notification message obtained through measurement in a user plane data packet, and reports the delay information and/or the first notification message to the first core network element, where the first notification message is used for indicating that the measurement behavior does not satisfy at least one item in the first rule.

The user plane data packet herein includes a first data stream data packet and/or a second data packet.

Specifically, the UE stores content of the delay information and/or the first notification message in a container, and reports the content to an AMF on the N1 interface through the NAS message, the AMF forwarding the content to the PCF, and the PCF further notifying the content to the SMF (if necessary). Alternatively, the UE directly sends the delay information and/or the first notification message to the AMF through an SM-NAS message, where the AMF forwards content of the SM-NAS to the PCF.

(3) The first access network element directly reports the delay information and/or the first notification message obtained through measurement to the first core network element or the second core network element, the first notification message being used for indicating that the measurement behavior does not satisfy at least one item in the first rule.

The first access network element reports, through a control plane data packet, the delay information and/or the first notification message obtained through measurement to the second core network element; or the first access network element reports, through a user plane data packet, the delay information and/or the first notification message obtained through measurement to the first core network element.

Specifically, a gNB directly reports the delay information and/or the first notification message to the UPF (a user plane) or SMF (a control plane).

(4) When the second node is the terminal, and the first node is the first core network element, the second node sends the delay information and/or the first notification message to the first node through a user plane, and the first node sends the delay information and/or the first notification message to the second core network element and/or a third core network element.

Further, a data packet carrying the delay information and/or the first notification message includes second indication information, and the first node sends the delay information and/or the first notification message to the second core network element and/or the third core network element after obtaining the second indication information. Alternatively, a data packet carrying the delay information and/or a first notification message is transmitted through a first data stream and/or a PDU session, and the first node sends, to the second core network element and/or the third core network element, information in the data packet transmitted through the first data stream and/or the PDU session.

In the foregoing solution, the first core network element, the first access network element, and the terminal may selectively attach a corresponding timestamp in the first data packet and/or the second data packet. On the other hand, the first core network element, the first access network element, and the terminal may also calculate corresponding delay information according to the timestamp information in the first data packet and/or the second data packet. For example, if a timestamp T1 is attached to the UPF in the downlink direction, a timestamp T2 is attached to the base station, a timestamp T3 is attached to the UE, and a timestamp T4 is attached to the base station in the returned uplink direction, and a time received by the UPF is T5, a round-trip delay is $D1=T5-T1$, a one-way delay is $D2=T3-T1$; an air interface delay is $D3=T3-T2$ or $D4=T4-T3$; a core network delay is $D5=T5-T4$ or $D6=T2-T3$.

FIG. 9 is a schematic flowchart V of an information transmission method according to an embodiment of this disclosure. As shown in FIG. 9, the information transmission method includes the following step.

Step 901: A first node receives first information sent by a second node, and determines a transmission delay requirement based on the first information, the transmission delay requirement including an upper limit requirement and/or a lower limit requirement for a transmission delay.

In an implementation, the second node is a first core network element, and the first node is a terminal or a first access network element (that is, a base station).

Herein, the receiving, by a first node, first information sent by a second node includes:

receiving, by the first node, the transmission delay requirement from the second node; or storing, by the first node, a correspondence between the transmission delay requirement and a first indication parameter, and after receiving the first indication parameter, determining, by the first node, a transmission delay requirement corresponding to the first indication parameter.

In the foregoing solution, the transmission requirement and/or the first indication parameter with a QoS rule are/is sent to the first node by the second node.

In an implementation, the second node is notified when the first node determines that delay information does not meet the transmission delay requirement.

FIG. 10 is a schematic structural diagram I of an information transmission apparatus according to an embodiment of this disclosure.

In an disclosure example, the apparatus is applied to a first node and includes:

a transmission unit 1001 configured to send a first data packet to a second node, the first data packet being used for measuring a one-way delay, and/or receiving a second data packet returned by the second node, the second data packet being used for measuring a round-trip delay.

In an implementation, the first data packet carries at least one kind of the following information: first identification information, second identification information, first sequence number information, and first timestamp information, the first identification information being used for indicating that the first data packet is used for measurement, the second identification information being used for indicating that the second node returns the second data packet after receiving the first data packet, the first sequence number information being used for identifying the first data packet, and the first timestamp information being used for indicating information about a time at which the first node sends the first data packet.

In an implementation, the second data packet carries at least one kind of the following information: first identification information, second identification information, second sequence number information, first timestamp information, and second timestamp information, the second sequence number information being used for identifying the second data packet, the second sequence number information being the same as the first sequence number information or having a correspondence with the first sequence number information, the second timestamp information being used for indicating information about a time at which the second node sends the second data packet to the first node and/or information about a time at which the first data packet is received from the first node.

In an implementation, the apparatus further includes:

a processing unit 1002 configured to determine information about a delay between the first node and the second node based on the first timestamp information and third timestamp information, the third timestamp information being used for indicating information about a time at which the first node receives the second data packet; and/or determine information about a delay between the first node and the second node based on the first timestamp information and the second timestamp information or the third timestamp information and the second timestamp information.

In an implementation, the first node is a first core network element, and the second node is a terminal;

information carried in the first data packet being added through a first protocol layer of the first node, the first protocol layer being located above a GTP-U layer; and information carried in the second data packet being added through a first protocol layer of the second node, the first protocol layer being located above an SDAP layer.

In an implementation, the first node is the terminal, and the second node is the first core network element;

information carried in the first data packet being added through a first protocol layer of the first node, the first protocol layer being located above an SDAP layer; and information carried in the second data packet being added through a first protocol layer of the second node, the first protocol layer being located above a GTP-U layer.

In an implementation, the first node is the first core network element, and the second node is a first access network element;

information carried in the first data packet being added through a GTP-U layer of the first node; and information carried in the second data packet being added through a GTP-U layer of the second node.

In an implementation, the first node is the first access network element, and the second node is the first core network element;

information carried in the first data packet being added through a GTP-U layer of the first node; and information carried in the second data packet being added through a GTP-U layer of the second node.

In an implementation, the apparatus further includes:

an acquiring unit 1003 configured to acquire a first rule from a second core network element; and a reporting unit 1004 configured to report, based on the first rule, delay information and/or a first notification message obtained through measurement.

In an implementation, the first rule includes at least one kind of the following:

first information, the first information being used for indicating whether a measurement behavior for delay information is triggered by the first node and/or the second node;

second information, the second information being used for indicating a measurement period or a measurement time point corresponding to the measurement behavior for the delay information;

third information, the third information being used for indicating whether a measurement result is reported for each measurement behavior;

fourth information, the fourth information including a delay exceeding a first delay threshold and/or a delay being lower than a second delay threshold; and fifth information, the fifth information being used for indicating to report a corresponding measurement result when delay information obtained through measurement exceeds the first delay threshold or is lower than the second delay threshold.

In an implementation, at least one kind of information in the first rule is sent to the first node in a dynamic manner or in a static manner.

The dynamic manner means that the first node receives complete content of at least one kind of information in the first rule.

The static manner means that the first node stores a correspondence between at least one kind of information in the first rule and first indication information, and the first node receives the first indication information, and determines at least one kind of information in the first rule based on the first indication information.

In an implementation, the first indication information is included in a QoS parameter. Further, the first indication information is a 5QI parameter in the QoS parameter.

In an implementation, when the first node is a first core network element, the reporting unit 1004 reports, through an N4 interface, the delay information and/or the first notification message obtained through measurement to the second core network element and/or the third core network element, the first notification message being used for indicating that the measurement behavior does not satisfy at least one item in the first rule.

In an implementation, when the first node is a terminal, the reporting unit 1004 carries the delay information and/or the first notification message obtained through measurement in a first container of a NAS message, and reports the delay information and/or the first notification message to the second core network element through an N1 interface; or the reporting unit 1004 carries the delay information and/or the first notification message obtained through measurement in a NAS message, and reports the delay information and/or the first notification message to the second core network element; or the reporting unit 1004 carries the delay information and/or the first notification message obtained through measurement in a user plane data packet, and reports the delay information and/or the first notification message to the first core network element, where the first notification message is used for indicating that the measurement behavior does not satisfy at least one item in the first rule.

In an implementation, the user plane data packet includes a first data stream data packet and/or a second data packet.

In an implementation, when the first node is a first access network element, the reporting unit 1004 directly reports the delay information and/or the first notification message obtained through measurement to the first core network element or the second core network element, the first notification message being used for indicating that the measurement behavior does not satisfy at least one item in the first rule.

Further, the reporting unit 1004 reports, through a control plane data packet, the delay information and/or the first notification message obtained through measurement to the second core network element; or the reporting unit 1004 reports, through a user plane data packet, the delay information and/or the first notification message obtained through measurement to the first core network element.

In an disclosure example, the apparatus is applied to a first node and includes:

a transmission unit 1001 configured to send a first data packet to a second node via a first access network element, the first data packet being used for measuring a one-way transmission delay, and/or receiving a second data packet returned by the second node via the first access network element, the second data packet being used for measuring a round-trip transmission delay.

In an implementation, the first data packet transmitted between the first node and the first access network element carries at least one kind of the following information: first identification information, second identification information, first sequence number information, and first timestamp information; and the first data packet transmitted between the first access network element and the second node carries at least one kind of the following information: first identification information, second identification information, first sequence number information, first timestamp information, and second timestamp information; where the first identification information is used for indicating that the first data packet is used for measurement; the second identification information is used for indicating that the second node returns a second data packet after receiving the first data packet, the first sequence number information is used for identifying the first data packet, the first timestamp information is used for indicating information about a time at which the first node sends the first data packet, and the second timestamp information is used for indicating information about a time at which the first access network element receives the first data packet from the first node and/or information about a time at which the first data packet is sent to the second node.

In an implementation, the second data packet transmitted between the second node and the first access network element carries at least one kind of the following information: first identification information, second identification information, second sequence number information, first timestamp information, second timestamp information, and third timestamp information; and the second data packet transmitted between the first access network element and the first node carries at least one kind of the following information: first identification information, second identification information, second sequence number information, first timestamp information, second timestamp information, third timestamp information, and fourth timestamp information; where the second sequence number information is used for identifying the second data packet, the second sequence number information is the same as the first sequence number information or has a correspondence with the first sequence number information, the third timestamp information is used for indicating information about a time at which the second node sends the second data packet to the first access network element and/or information about a time at which the first data packet is received from the first access network element, and the fourth timestamp information is used for indicating information about a time at which the first access network element sends the second data packet to the first node and/or information about a time at which the second data packet is received from the second node.

In an implementation, the apparatus further includes:

a processing unit 1002 configured to: determine information about a delay between the first node and the second node based on the first timestamp information and fifth timestamp information, the fifth timestamp information being used for indicating information about a time at which the first node receives the second data packet; and/or determine information about a delay between the first node and the second node based on the first timestamp information and the third timestamp information or the fifth timestamp information and the third timestamp information; and/or determine information about a delay between the second node and the first access network element based on the second timestamp information and the third timestamp information or the third timestamp information and the fourth timestamp information; and/or information about a delay between the first node and the first access network element based on the first timestamp information and the second timestamp information or the fourth timestamp information and the fifth timestamp information.

In an implementation, the first node is a first core network element, and the second node is a terminal;

information carried in the first data packet transmitted between the first node and the first access network element being added through a GTP-U layer of the first node;

information carried in the first data packet transmitted between the first access network element and the second node being added through an SDAP layer and/or a PDCP layer of the first access network element;

information carried in the second data packet transmitted between the second node and the first access network element being added through an SDAP layer and/or a PDCP layer of the second node; and information carried in the second data packet transmitted between the first access network element and the first node being added through a GTP-U layer of the first access network element.

In an implementation, the first node is the terminal, and the second node is the first core network element;

information carried in the first data packet transmitted between the first node and the first access network element being added through an SDAP layer and/or a PDCP layer of the first node;

information carried in the first data packet transmitted between the first access network element and the second node being added through a GTP-U layer of the first access network element;

information carried in the second data packet transmitted between the second node and the first access network element being added through a GTP-U layer of the second node; and information carried in the second data packet transmitted between the first access network element and the first node being added through an SDAP layer and/or a PDCP layer of the first access network element.

In an implementation, the apparatus further includes:

an acquiring unit 1003 configured to acquire a first rule from a second core network element; and a reporting unit 1004 configured to report, based on the first rule, delay information and/or a first notification message obtained through measurement.

In an implementation, the first rule includes at least one kind of the following:

first information, the first information being used for indicating whether a measurement behavior for delay information is triggered by the first node and/or the second node;

second information, the second information being used for indicating a measurement period or a measurement time point corresponding to the measurement behavior for the delay information;

third information, the third information being used for indicating whether a measurement result is reported for each measurement behavior;

fourth information, the fourth information including a delay exceeding a first delay threshold and/or a delay being lower than a second delay threshold; and fifth information, the fifth information being used for indicating to report a corresponding measurement result when delay information obtained through measurement exceeds the first delay threshold or is lower than the second delay threshold.

In an implementation, at least one kind of information in the first rule is sent to the first node in a dynamic manner or in a static manner.

The dynamic manner means that the first node receives complete content of at least one kind of information in the first rule.

The static manner means that the first node stores a correspondence between at least one kind of information in the first rule and first indication information, and the first node receives the first indication information, and determines at least one kind of information in the first rule based on the first indication information.

In an implementation, the first indication information is included in a QoS parameter. Further, the first indication information is a 5QI parameter in the QoS parameter.

In an implementation, when the first node is a first core network element, the reporting unit 1004 reports, through an N4 interface, the delay information and/or the first notification message obtained through measurement to the second core network element and/or the third core network element, the first notification message being used for indicating that the measurement behavior does not satisfy at least one item in the first rule.

In an implementation, when the first node is a terminal, the reporting unit 1004 carries the delay information and/or the first notification message obtained through measurement in a first container of a NAS message, and reports the delay information and/or the first notification message to the second core network element through an N1 interface; or the reporting unit 1004 carries the delay information and/or the first notification message obtained through measurement in a NAS message, and reports the delay information and/or the first notification message to the second core network element; or the reporting unit 1004 carries the delay information and/or the first notification message obtained through measurement in a user plane data packet, and reports the delay information and/or the first notification message to the first core network element, where the first notification message is used for indicating that the measurement behavior does not satisfy at least one item in the first rule.

In an implementation, the user plane data packet includes a first data stream data packet and/or a second data packet.

In an implementation, the first access network element directly reports the delay information and/or the first notification message obtained through measurement to the first core network element or the second core network element, the first notification message being used for indicating that the measurement behavior does not satisfy at least one item in the first rule. The first access network element reports, through a control plane data packet, the delay information and/or the first notification message obtained through measurement to the second core network element; or the first access network element reports, through a user plane data packet, the delay information and/or the first notification message obtained through measurement to the first core network element.

In an implementation, when the first node is the terminal, and the second node is the first core network element, the reporting unit 1004 sends the delay information and/or the first notification message to the second node through a user plane, and the second node sends the delay information and/or the first notification message to the second core network element and/or a third core network element.

In an implementation, a data packet carrying the delay information and/or the first notification message includes second indication information, and the second node sends the delay information and/or the first notification message to the second core network element and/or the third core network element after obtaining the second indication information.

In an implementation, a data packet carrying the delay information and/or a first notification message is transmitted through a first data stream and/or a PDU session, and the second node sends, to the second core network element and/or the third core network element, information in the data packet transmitted through the first data stream and/or the PDU session.

Those skilled in the art should understand that the related description of the foregoing information transmission apparatus in the embodiment of this disclosure may be understood by referring to the related description of the information transmission method in the embodiment of this disclosure.

FIG. 11 is a schematic structural diagram II of an information transmission apparatus according to an embodiment of this disclosure. In an application example, the apparatus is applied to a first node and includes:

a determining unit 1101 configured to receive first information sent by a second node, and determine a transmission delay requirement based on the first information, the transmission delay requirement including an upper limit requirement and/or a lower limit requirement for a transmission delay.

In an implementation, the determining unit 1101 is configured to: receive the transmission delay requirement from the second node; or store a correspondence between the transmission delay requirement and a first indication parameter, and determine a transmission delay requirement corresponding to the first indication parameter after receiving the first indication parameter.

In an implementation, the second node is a first core network element, and the first node is a terminal or a first access network element.

In an implementation, the transmission requirement and/or the first indication parameter with a QoS rule are/is sent to the first node by the second node.

In an implementation, the apparatus further includes:
a notifying unit 1102 configured to notify the second node when it is determined that delay information does not meet the transmission delay requirement.

An embodiment of this disclosure further provides an information transmission method, including: acquiring, by a first node, first information from a core network, the first information being used to determine a first delay threshold and a second delay threshold; and controlling, by the first node, a transmission delay between the first node and a second node to be between the first delay threshold and the second delay threshold.

In an implementation, the first information includes a first delay offset and a second delay offset, the first delay threshold being determined based on the first delay offset and reference delay information, and the second delay threshold being determined based on the second delay offset and the reference delay information. In another implementation, the first information includes a first delay offset and a second delay offset.

During establishment or modification of a PDU session, the first node receives the first delay threshold and/or the second delay threshold sent by a second core network element. The first node is a first access network element (such as a base station) or a terminal. The second core network element is an SMF. The second node may be any network element different from the first node.

Correspondingly, an embodiment of this application further provides an information transmission apparatus applied to a first node, the apparatus including:
an acquiring unit configured to acquire first information from a core network, the first information being used to determine a first delay threshold and a second delay threshold; and
a processing unit configured to control a transmission delay between the first node and a second node to be between the first delay threshold and the second delay threshold.

In an implementation, the first information includes a first delay offset and a second delay offset, the first delay threshold being determined based on the first delay offset and reference delay information, and the second delay threshold being determined based on the second delay offset and the reference delay information.

In an implementation, the acquiring unit is configured to receive, during establishment or modification of a PDU session, the first delay threshold and/or the second delay threshold sent by the second core network element.

In an implementation, the first node is a first access network element or a terminal.

FIG. 12 is a schematic structural diagram of a communication device 600 according to an embodiment of the present disclosure. The communication device may be a terminal device or a network device. The communication device 600 shown in FIG. 12 includes a processor 610. The processor 610 may invoke and run a computer program from a memory to implement the method in the embodiment of the present disclosure.

Optionally, as shown in FIG. 12, the communication device 600 may further include a memory 620. The processor 610 may invoke and run the computer program from the memory 620 to implement the method in the embodiment of the present disclosure.

The memory 620 may be a single device independent of the processor 610, or may be integrated in the processor 610.

Optionally, as shown in FIG. 12, the communication device 600 may further include a transceiver 630, and the processor 610 may control the transceiver 630 to communicate with other devices, and specifically, may send information or data to other devices, or receive information or data sent by the other devices.

The transceiver 630 may include a transmitter and a receiver. The transceiver 630 may further include antennas, and a quantity of antennas may be one or more.

Optionally, the communication device 600 may specifically be a network device according to the embodiment of the present disclosure, and the communication device 600 may implement a corresponding procedure implemented by the network device in each method of the embodiment of the present disclosure. For brevity, details are not described herein again.

Optionally, the communication device 600 may specifically be a mobile terminal/terminal device according to the embodiment of the present disclosure, and the communication device 600 may implement a corresponding procedure implemented by the mobile terminal/terminal device in each method of the embodiment of the present disclosure. For brevity, details are not described herein again.

Figure 13:
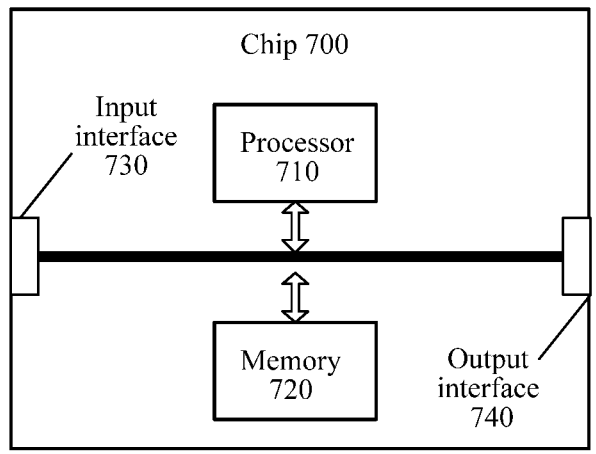
FIG. 13 is a schematic structural diagram of a chip according to an embodiment of this disclosure.

FIG. 13 is a schematic structural diagram of a chip according to an embodiment of the present disclosure. The chip 700 shown in FIG. 13 includes a processor 710, and the processor 710 can invoke and run a computer program from a memory to implement the method in the embodiment of the present disclosure.

Optionally, as shown in FIG. 13, the chip 700 may further include a memory 720. The processor 710 may invoke and run the computer program from the memory 720 to implement the method in the embodiment of the present disclosure.

The memory 720 may be a single device independent of the processor 710, or may be integrated in the processor 710.

Optionally, the chip 700 may further include an input interface 730. The processor 710 may control the input interface 730 to communicate with other devices or chips. Specifically, the processor 710 may obtain information or data sent by the other devices or chips.

Optionally, the chip 700 may further include an output interface 740. The processor 710 may control the output interface 740 to communicate with other devices or chips. Specifically, the processor 710 may output information or data to the other devices or chips.

Optionally, the chip may be applied to the network device in the embodiment of the present disclosure, and the chip may implement the corresponding procedure implemented by the network device in each method of the embodiment of the present disclosure. For brevity, details are not described herein again.

Optionally, the chip can be applied to the mobile terminal/terminal device in the embodiments of the present disclosure, and the chip can implement the corresponding procedure implemented by the mobile terminal/terminal device in each method of the embodiments of the present disclosure. For brevity, details are not described herein again.

It should be understood that the chip mentioned in the embodiments of the present disclosure may also be referred to as a system-level chip, a system chip, a chip system or a system-on-chip.

Figure 14:
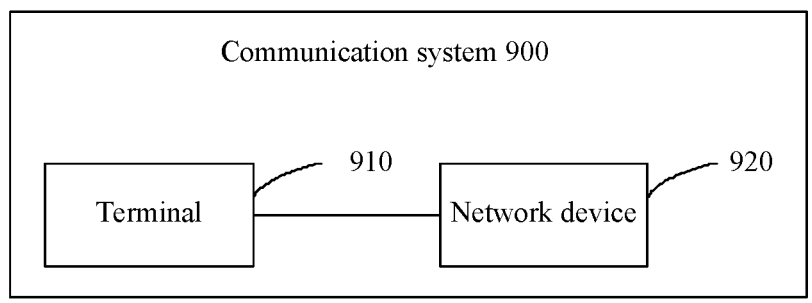
FIG. 14 is a schematic block diagram of a communication system according to an embodiment of this disclosure.

FIG. 14 is a schematic block diagram of a communication system 900 according to an embodiment of the present disclosure. As shown in FIG. 14, the communication system 900 includes a terminal device 910 and a network device 920.

The terminal device 910 may be used to implement the corresponding functions implemented by the terminal device in the foregoing method, and the network device 920 may be used to implement the corresponding functions implemented by the network device in the foregoing method. For brevity, details are not described herein again.

It should be understood that, the processor in the embodiment of the present disclosure may be an integrated circuit chip and has a signal processing capability. In the implementation process, each step of the foregoing method embodiment may be completed by using an integrated logic circuit of hardware in a processor or an instruction in a form of software. The above processor may be a general-purpose processor, a digital signal processor (DSP), an application specific integrated circuit (ASIC), a field programmable gate array (FPGA), or other programming logic devices, discrete gate or transistor logic devices, discrete hardware components. Various methods, steps, and logical block diagrams disclosed in the embodiments of the present disclosure can be implemented or executed. The general-purpose processor may be a microprocessor or the processor may be any conventional processor or the like. The steps of the method disclosed in combination with the embodiments of the present disclosure may be directly implemented by a hardware decoding processor, or may be performed by using a combination of hardware and software modules in the decoding processor. The software module may be located in a mature storage medium such as a random access memory, a flash memory, a read-only memory, a programmable read-only memory, or an electrically erasable programmable memory, a register, and the like. The storage medium is located in a memory, and the processor reads the information in the memory and completes the steps of the foregoing method in combination with its hardware.

It can be understood that, the memory in the embodiment of the present disclosure may be a volatile memory or a non-volatile memory, or may include both volatile and non-volatile memory. The non-volatile memory may be a read-only memory (ROM), a programmable read-only memory (PROM), an erasable programmable read-only memory (EPROM), an electrically erasable programmable read-only memory (EEPROM) or flash memory. The volatile memory may be a random access memory (RAM), which is used as an external cache. By way of example, but not limitation, many forms of RAM are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous connection dynamic random access memory (SLDRAM), and a direct memory bus random access memory (DR RAM). It should be noted that the memory of the systems and methods described herein is intended to include, but not limited to, these and any other suitable types of memory.

It should be understood that, the foregoing memory is exemplary but not restrictive. For example, the memory in the embodiment of the present disclosure may also be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous connection dynamic random access memory (SLDRAM), and a direct memory bus random access memory (DR RAM), etc. That is, the memories in the embodiments of the present disclosure are intended to include, but not limited to, these and any other suitable types of memories.

An embodiment of the present disclosure further provides a computer-readable storage medium for storing a computer program.

Optionally, the computer-readable storage medium may be applied to the network device in the embodiment of the present disclosure, and the computer program enables the computer to execute the corresponding procedure implemented by the network device in each method in the embodiment of the present disclosure. For brevity, details are not described herein again.

Optionally, the computer-readable storage medium may be applied to the mobile terminal/terminal device in the embodiment of the present disclosure, and the computer program enables the computer to execute a corresponding procedure implemented by the mobile terminal/terminal device in each method in the embodiment of the present disclosure. For brevity, details are not described herein again.

An embodiment of the present disclosure further provides a computer program product, including computer program instructions.

Optionally, the computer program product may be applied to the network device in the embodiment of the present disclosure, and the computer program instruction enables the computer to execute a corresponding procedure implemented by the network device in each method in the embodiment of the present disclosure. For brevity, details are not described herein again.

Optionally, the computer program product may be applied to a mobile terminal/terminal device in the embodiments of the present disclosure, and the computer program instructions enable the computer to execute a corresponding procedure implemented by the mobile terminal/terminal device in each method in the embodiments of the present disclosure. For brevity, details are not described herein again.

The embodiment of the present disclosure further provides a computer program.

Optionally, the computer program may be applied to a network device in the embodiment of the present disclosure. When the computer program is run on a computer, the computer is enabled to execute a corresponding procedure implemented by the network device in each method in the embodiment of the present disclosure. For brevity, details are not described herein again.

Optionally, the computer program may be applied to a mobile terminal/terminal device in the embodiment of the present disclosure. When the computer program is run on a computer, the computer is enabled to execute each method in the embodiment of the disclosure by the mobile terminal/terminal device. For brevity, details are not described herein again.

A person of ordinary skill in the art may realize that the units and algorithm steps of each example described in combination with the embodiments disclosed herein can be implemented by electronic hardware or a combination of computer software and electronic hardware. Whether these functions are performed in hardware or software depends on the specific application and design constraints of the technical solution. Professional technicians can use different methods to implement the described functions for each specific application, but such implementation should not be considered to be beyond the scope of the present disclosure.

A person skilled in the art may clearly understand that, for the convenience and brevity of description, the specific working processes of the systems, devices, and units described above may refer to the corresponding processes in the foregoing method embodiments, and details are not described herein again.

In the several embodiments provided in the present disclosure, it should be understood that, the disclosed systems, devices, and methods may be implemented in other ways. For example, the device embodiments described above are only exemplary. For example, the division of the unit is only a logical function division. In actual implementation, there may be another division manner. For example, a plurality of units or components may be combined or may be integrated into another system, or some features can be ignored or not implemented. In addition, the displayed or discussed mutual coupling or direct coupling or communication connection may be indirect coupling or communication connection through some interfaces, devices or units, which may be electrical, mechanical or other forms.

The units described as separate components may or may not be physically separated, and the components displayed as units may or may not be physical units, that is, may be located in one place, or may be distributed on a plurality of network units. Some or all of the units may be selected according to actual needs to achieve the objective of the solution of this embodiment.

In addition, each functional unit in each embodiment of the present disclosure may be integrated into one processing unit, or each of the units may exist separately physically, or two or more units may be integrated into one unit.

If the functions are implemented in the form of software functional units and sold or used as independent products, they can be stored in a computer-readable storage medium. Based on this understanding, the technical solution of the present disclosure is essentially a part that contributes to the prior art or a part of the technical solution can be embodied in the form of a software product, which is stored in a storage medium, including several instructions that are used to enable a computer device (which may be a personal computer, a server, or a network device, etc.) to perform all or part of the steps of the method described in each embodiment of the present disclosure. The foregoing storage media include: U disks, mobile hard disks, read-only memory (ROM), random access memory (RAM), magnetic disks or optical disks, and other media that can store program codes.

The above is only a specific implementation of the present disclosure, but the scope of protection of the present disclosure is not limited to this. Any person skilled in the art can easily think that changes or replacements within the technical scope disclosed in the present disclosure should be covered by the protection scope of this disclosure. Therefore, the protection scope of the present disclosure shall be subject to the protection scope of the claims.

The invention claimed is:

1. An information transmission method, comprising:
sending, by a User plane Function (UPF) entity of a core network element, a first data packet to a terminal, the first data packet being used for the terminal to measure a one-way delay between the UPF entity of the core network element and the terminal, and information carried in the first data packet being added by a first protocol layer of the UPF entity of the core network element, the first protocol layer of the UPF entity is located above a General Packet Radio Service (GPRS) Tunneling Protocol (GTP)-User plane (GTP-U) layer.

2. The method according to claim 1, wherein the method further comprises:
acquiring, by the UPF entity of the core network element, a first rule from a second core network element, and reporting, based on the first rule, delay information and/or a first notification message obtained through measurement.

3. The method according to claim 1, wherein the method comprises:
receiving, by the UPF entity of the core network element, a second data packet returned by the terminal, the second data packet being used for the UPF entity of the core network element to measure a round-trip delay between the UPF entity of the core network element and the terminal; information carried in the second data packet being added by a first protocol layer of the terminal, the first protocol layer of the terminal being located above a Service Data Adaptation Protocol (SDAP) layer.

4. The method according to claim 3, wherein the first data packet carries at least one kind of the following information: first identification information, second identification information, first sequence number information, and first timestamp information, the first identification information being used for indicating that the first data packet is used for measurement, the second identification information being used for indicating that the terminal returns the second data packet after receiving the first data packet, the first sequence number information being used for identifying the first data packet, and the first timestamp information being used for indicating information about a time at which the UPF entity of the core network element sends the first data packet.

5. The method according to claim 4, wherein the second data packet carries at least one kind of the following information: the first identification information, the second identification information, second sequence number information, the first timestamp information, and second timestamp information, the second sequence number information being used for identifying the second data packet, the second sequence number information being the same as the first sequence number information or having a correspondence with the first sequence number information, the second timestamp information being used for indicating information about a time at which the terminal sends the second data packet to the UPF entity of the core network element and/or information about a time at which the first data packet is received from the UPF entity of the core network element.

6. The method according to claim 5, wherein after the UPF entity of the core network element receives the second data packet sent by the terminal, the method further comprises:
determining information about a delay between the UPF entity of the core network element and the terminal based on the first timestamp information and third timestamp information, the third timestamp information being used for indicating information about a time at which the UPF entity of the core network element receives the second data packet; and/or determining information about a delay between the UPF entity of the core network element and the terminal based on the first timestamp information and the second timestamp information or the third timestamp information and the second timestamp information.

7. An information transmission method, comprising:
receiving, by a terminal, a first data packet, the first data packet carrying first timestamp information of sending the first data packet; and
calculating, by the terminal, information about delay between a User plane Function (UPF) entity of a core network element and the terminal based on the first timestamp information carried in a first protocol layer of the first data packet and second timestamp information of receiving the first data packet;
wherein the first timestamp information carried in the first data packet is added by the first protocol layer of the UPF entity, the first protocol layer is located above a General Packet Radio Service (GPRS) Tunneling Protocol (GTP)-User plane (GTP-U) layer; and the first data packet is transparently transmitted to the terminal through Access Network (AN).

8. The method according to claim 7, wherein the first data packet carries first identification information, and the first identification information is used for indicating that the first data packet is used for measuring delay.

9. An information transmission apparatus applied to a User plane Function (UPF) entity of a core network element, the apparatus comprising:
a transceiver, configured to send a first data packet to a terminal, the first data packet being used for the terminal to measure a one-way delay between the UPF entity of the core network element and the terminal; information carried in the first data packet being added through a first protocol layer of the UPF entity of the core network element, the first protocol layer of the UPF entity being located above a General Packet Radio Service (GPRS) Tunneling Protocol (GTP)-User plane (GTP-U) layer.

10. The apparatus according to claim 8, wherein the transceiver is further configured to:
acquire a first rule from a second core network element; and
report, based on the first rule, delay information and/or a first notification message obtained through measurement.

11. The apparatus according to claim 9, wherein the transceiver is configured to receive a second data packet returned by the terminal, the second data packet being used for the UPF entity of the core network element to measure a round-trip delay between the UPF entity of the core network element and the terminal; information carried in the second data packet being added by a first protocol layer of the terminal, the first protocol layer of the terminal being located above a Service Data Adaptation Protocol (SDAP) layer.

12. The apparatus according to claim 11, wherein the first data packet carries at least one kind of the following information: first identification information, second identification information, first sequence number information, and first timestamp information, the first identification information being used for indicating that the first data packet is used for measurement, the second identification information being used for indicating that the terminal returns the second data packet after receiving the first data packet, the first sequence number information being used for identifying the first data packet, and the first timestamp information being configured to indicate information about a time at which the UPF entity of the core network element sends the first data packet.

13. The apparatus according to claim 12, wherein the second data packet carries at least one kind of the following information: the first identification information, the second identification information, second sequence number information, the first timestamp information, and second timestamp information, the second sequence number information being used for identifying the second data packet, the second sequence number information being the same as the first sequence number information or having a correspondence with the first sequence number information, the second timestamp information being used for indicating information about a time at which the terminal sends the second data packet to the UPF entity of the core network element and/or information about a time at which the first data packet is received from the UPF entity of the core network element.

14. The apparatus according to claim 13, wherein the apparatus further comprises:
a processor, configured to determine information about a delay between the UPF entity of the core network element and the terminal based on the first timestamp information and third timestamp information, the third timestamp information being used for indicating information about a time at which the UPF entity of the core network element receives the second data packet; and/or determine information about a delay between the UPF entity of the core network element and the terminal based on the first timestamp information and the second timestamp information or the third timestamp information and the second timestamp information.

15. An information transmission apparatus applied to a terminal, the apparatus comprising:
a transceiver, configured to receive a first data packet, the first data packet carrying first timestamp information of sending the first data packet; and
a processor, configured to calculate information about delay between a User plane Function (UPF) entity of a core network element and the terminal based on the first timestamp information carried in a first protocol layer of the first data packet and second timestamp information of receiving the first data packet;
wherein the first timestamp information carried in the first data packet is added by the first protocol layer of the UPF entity, the first protocol layer is located above a General Packet Radio Service (GPRS) Tunneling Protocol (GTP)-User plane (GTP-U) layer; and the first data packet is transparently transmitted to the terminal through Access Network (AN).

16. The apparatus according to claim 15, wherein the first data packet carries first identification information, and the first identification information is used for indicating that the first data packet is used for measuring delay.

* * * * *